United States Patent
Nistor

(10) Patent No.: US 10,606,770 B2
(45) Date of Patent: Mar. 31, 2020

(54) MICROCONTROLLER SYSTEM AND METHOD FOR CONTROLLING MEMORY ACCESS IN A MICROCONTROLLER SYSTEM

(71) Applicant: Continental Teves AG & Co. oHG, Frankfurt (DE)

(72) Inventor: Flaviu Constantin Nistor, Sibiu (RO)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/780,510

(22) PCT Filed: Dec. 12, 2016

(86) PCT No.: PCT/EP2016/080649
§ 371 (c)(1),
(2) Date: May 31, 2018

(87) PCT Pub. No.: WO2017/102655
PCT Pub. Date: Jun. 22, 2017

(65) Prior Publication Data
US 2018/0373649 A1   Dec. 27, 2018

(30) Foreign Application Priority Data

Dec. 15, 2015  (EP) .................................. 15465564
Nov. 17, 2016  (DE) ....................... 10 2016 222 691

(51) Int. Cl.
*G06F 12/14*   (2006.01)
*G06F 13/16*   (2006.01)
(Continued)

(52) U.S. Cl.
CPC ...... *G06F 12/1458* (2013.01); *G06F 13/1663* (2013.01); *G06F 21/62* (2013.01);
(Continued)

(58) Field of Classification Search
CPC ...... G06F 12/1458; G06F 21/85; G06F 21/79; G06F 21/62; G06F 13/1663; G06F 2221/2141; G06F 2221/2149
See application file for complete search history.

(56) References Cited

U.S. PATENT DOCUMENTS 9,703,728 B2   7/2017  Hellwig et al.
2003/0200451 A1*  10/2003  Evans ................. G06F 12/1483
                                                713/193

(Continued)

FOREIGN PATENT DOCUMENTS

DE   102013016114 B3   2/2015

OTHER PUBLICATIONS

International Search Report and Written Opinion for International Application No. PCT/EP2016/080649, dated Feb. 20, 2017, 8 pages.

(Continued)

*Primary Examiner* — Francisco A Grullon
(74) *Attorney, Agent, or Firm* — RatnerPrestia

(57) ABSTRACT

A microcontroller system including a main core and a secondary core and a communication bus for transmitting data and a data memory for storing data, wherein the data memory has a memory area for which the secondary core at least does not have any write rights, and wherein the microcontroller system includes a memory access module and a configuration memory area, wherein a configuration for authorizing writing of data provided by the secondary core to the memory area of the data memory is provided in the configuration memory area, wherein the data are written to the memory area of the data memory by the memory access module. The invention furthermore describes a corresponding method.

20 Claims, 1 Drawing Sheet

(51) Int. Cl.
*G06F 21/79* (2013.01)
*G06F 21/85* (2013.01)
*G06F 21/62* (2013.01)

(52) U.S. Cl.
CPC .............. *G06F 21/79* (2013.01); *G06F 21/85* (2013.01); *G06F 2221/2141* (2013.01); *G06F 2221/2149* (2013.01)

(56) References Cited

U.S. PATENT DOCUMENTS

2010/0005213 A1* 1/2010 Butter ................. G06F 13/4031
710/309
2012/0216002 A1 8/2012 Moyer et al.

OTHER PUBLICATIONS

German Search Report for German Application No. 10 2016 222 691.6, dated Jun. 6, 2017, including partial English translation, 10 pages.

* cited by examiner

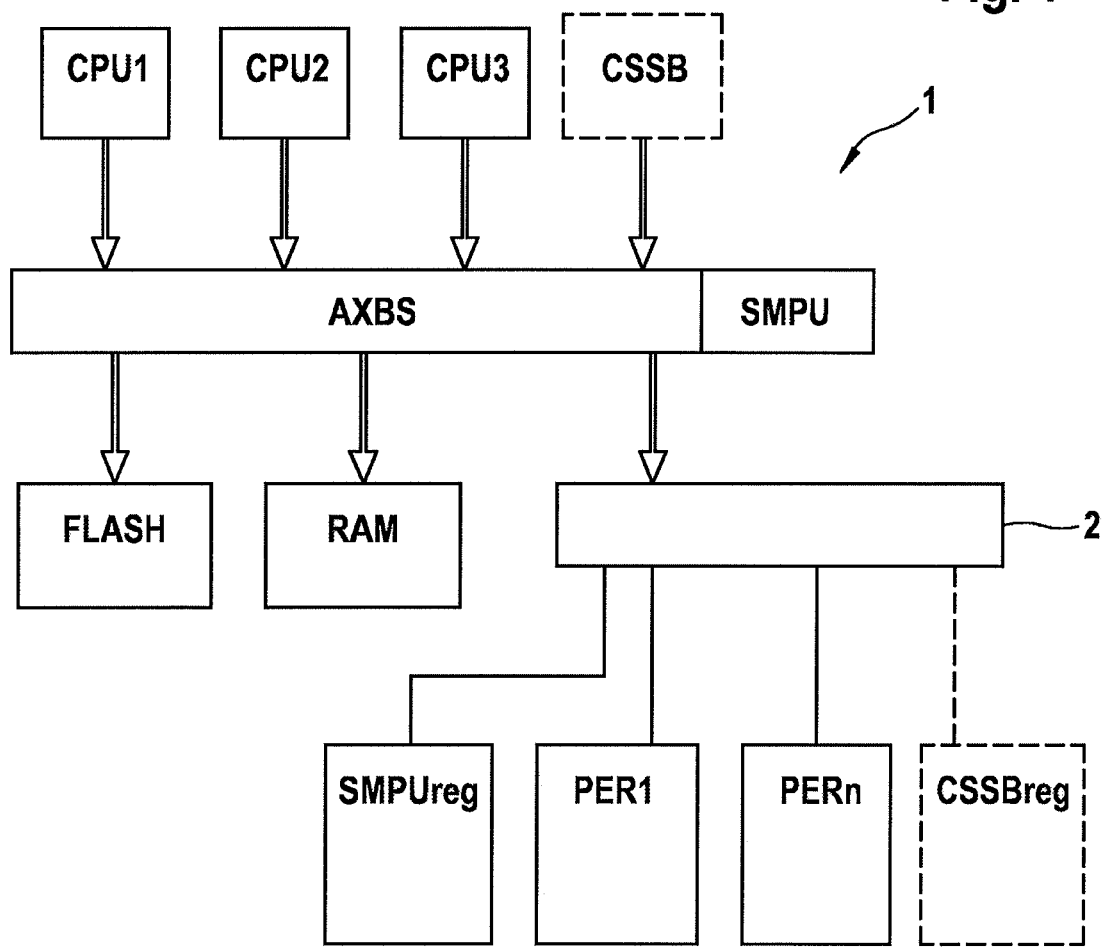

MICROCONTROLLER SYSTEM AND METHOD FOR CONTROLLING MEMORY ACCESS IN A MICROCONTROLLER SYSTEM

CROSS REFERENCE TO RELATED APPLICATIONS

This application is the U.S. National Phase Application of PCT International Application No. PCT/EP2016/080649, filed Dec. 12, 2016, which claims priority to European Patent Application No. EP15465564, filed Dec. 15, 2015 and German Patent Application No. 10 2016 222 691.6, filed Nov. 17, 2016, the contents of such applications being incorporated by reference herein.

FIELD OF THE INVENTION

The present invention relates to a microcontroller system and to a method for controlling memory access operations in a microcontroller system.

BACKGROUND OF THE INVENTION

Multi-core microcontroller systems are often implemented in such a manner that all available cores can access the same resources, for example memory or peripherals. A "memory management unit" (MMU) or "memory protection unit" (MPU) or "system memory protection unit" (SMPU) is usually provided for the purpose of controlling access to specific memory areas or peripherals and can be used to control memory access for applications executed on the cores. For reasons of safety, only a main core provided for this purpose has write rights for registers of the memory management unit in order to configure the access authorization of the secondary cores. Such a restriction of the access authorization for the secondary cores can be achieved, in particular, by means of appropriate implementation in hardware. For example, basic software and safety-relevant software are executed by the main core and application-specific software is accordingly executed by the secondary cores.

For example, information relating to blocked write access operations of a secondary core to memory areas which have not been enabled for write access operations for this secondary core can be stored until the corresponding flags in error registers of the memory management unit have been deleted. Unlike the main core, the secondary cores cannot delete these flags, with the result that the access operations following a first blocked access operation cannot be captured and useful information may therefore possibly be lost if the system state is logged, for example in the event of a blocked write access operation. It is often not possible to authorize a fundamental write authorization of the secondary cores for these error registers for reasons of maintaining a safety requirement level of the functional safety of the underlying system.

SUMMARY OF THE INVENTION

An aspect of the invention provides a microcontroller system which can be used to integrate software modules, in particular with a high resource requirement, in a more effective and more efficient manner.

An aspect of the invention relates to a microcontroller system comprising a main core and a secondary core and a communication bus for transmitting data and a data memory for storing data, wherein the data memory has a memory area for which the secondary core at least does not have any write rights, and wherein the microcontroller system comprises a memory access module and a configuration memory area, wherein a configuration for authorizing writing of data provided by the secondary core to the memory area of the data memory is provided in the configuration memory area, wherein the data are written to the memory area of the data memory by the memory access module. The microcontroller system according to the invention is preferably accordingly a multi-core microcontroller system or a multi-core microprocessor system, wherein the plurality of cores are surrounded by a common circuit housing and the cores are situated on a common substrate. Within the scope of the description of the invention, the terms "multi-core microprocessor system" and "multi-core microcontroller system" are used synonymously.

The configuration therefore advantageously makes it possible to stipulate which secondary core is allowed to make changes, wherein the actual write operation is carried out by the memory access module. An improved ability to adapt to safety-related requirements is therefore provided by the invention and highest safety requirements can also be met. The microcontroller system is preferably configured in such a manner that different applications or software modules can be executed at the same time by the main core and secondary cores. For these situations, the solution according to the invention enables complex software-based implementation of data flow control ("handshake") between various software modules which are often also executed in an asynchronous manner on account of being executed on the main core and the secondary core. However, since data are written under the control of the main core without it being actively involved during the write operation, the invention therefore advantageously makes it possible to Immediately update data in the data memories, with the result that the execution of a software module executed on a secondary core can be continued without interruption.

The memory access module and the main core are preferably assigned to the communication bus as master. The main core preferably has unrestricted access rights and the secondary core preferably has restricted write access rights to the configuration memory area. The memory access module and the main core therefore preferably have supervisor rights in the microcontroller system, as a result of which further functional system components which are connected to the communication bus and permit write access operations of the main core also accept write access operations of the memory access module.

According to one advantageous embodiment of the invention, the configuration can be stored in the configuration memory area by means of the main core. Accordingly, the main core is expediently configured to provide the configuration stored in the configuration memory area.

The microcontroller system is preferably configured in such a manner that the writing of the data to the memory area of the data memory can be initiated by virtue of the data being provided by the secondary core. An aspect of the invention advantageously makes it possible for secondary cores which do not have any write rights to particular data memories, in particular for the purpose of ensuring a required functional safety level, for example according to ISO 26262, to change the data present in these data memories by means of the configuration under the control of the main core. For example, it is possible to delete flags in the registers of a memory management unit, with the result that the access operations following a first blocked access operation can also be captured and useful information can therefore possibly be received.

According to one advantageous development of an aspect of the invention, the configuration memory area comprises at least one configuration segment for configuring the authorization of the secondary core.

The configuration segment preferably has an identifier field having an identifier for authorizing the secondary core having a matching identifier to write data to a data field included in the configuration segment, wherein the secondary core has write access rights for the data field and does not have any write access rights for the identifier field. The writing of the data to the memory area of the data memory can preferably be initiated by the secondary core authorized by means of the corresponding identifier by writing at least the data to the data field of the configuration segment.

According to one preferred embodiment, if the identifiers of the identifier field and of the secondary core do not match, the memory access module is configured to block write access to the data field.

The configuration segment preferably has a memory requirement field for storing a memory requirement of the data written to the data field by the secondary core, wherein the secondary core has write access rights for the memory requirement field.

The configuration segment preferably comprises an address field for storing an address of the memory area of the data memory, wherein the secondary core does not have any write access rights for the address field. The address stored in the address field is expediently the starting address of the memory area.

The configuration segment preferably comprises a mask field for storing a mask of the data provided by the secondary core, wherein the secondary core does not have any write access rights for the mask field. Before being stored in the memory area, the data can be advantageously modified by means of the mask stored in the mask field in such a manner that masked bits are not changed, for example.

According to one preferred embodiment of an aspect of the invention, the secondary core has write access rights for the data field and/or the memory requirement field and does not have any write access rights at least for the address field and/or the identifier field and/or the mask field. Since the main core has unrestricted access rights to the configuration memory area, it preferably has write rights for all fields of the configuration segment.

According to one preferred development of an aspect of the invention, the main core is configured in such a manner that it stores the configuration during or after a restart of the microprocessor system. The configuration stored by means of the main core preferably comprises the identifier in the identifier field and/or the address in the address field and/or the mask in the mask field.

At least one memory management unit is preferably provided for the purpose of controlling memory access of the microprocessor system. The data memory is preferably a register of the memory management unit.

According to one preferred embodiment of an aspect of the invention, the memory access module can comprise the configuration memory area. The memory access module can expediently have a configuration data memory for this purpose. At least one register of the memory access module is expediently provided as the configuration memory area for storing the configuration.

Furthermore, an aspect of the invention can be advantageously substantially implemented in hardware, in which case only comparatively simple software routines can be provided.

A microcontroller system according to an aspect of the invention can comprise a plurality of main cores and/or a plurality of secondary cores.

The microcontroller system is preferably configured in such a manner that it can carry out the method according to the invention.

Such safety-relevant microcontroller systems are used, for example, in brake systems of vehicles.

An aspect of the invention furthermore relates to a method for controlling memory access operations in a microcontroller system, in which at least one secondary core does not have any write rights for a memory area of a data memory for storing data, and which is also distinguished by the fact that the secondary core provides data which are intended to be written to the memory area, wherein a configuration stored in a configuration memory area is used to check whether an authorization for writing the provided data to the memory area of the data memory is available for the secondary core, wherein, if an authorization is available, the data are written to the memory area of the data memory by means of a memory access module.

The changes in service routines are preferably initiated by exception handling and/or interrupts.

Further preferred embodiments emerge from the following description of exemplary embodiments on the basis of figures.

The method according to an aspect of the invention is preferably carried out on a microcontroller system according to the invention.

BRIEF DESCRIPTION OF THE DRAWINGS

Further preferred embodiments emerge from the following description of exemplary embodiments on the basis of figures.

In schematic representation:

FIG. 1 shows an exemplary embodiment of the microcontroller system according to an aspect of the invention, and FIG. 2 shows an exemplary configuration segment 3 which is stored in the CSSB register CSSBreg and is intended to configure the access control of processor cores CPU2 and CPU3 which are coordinate to the main core CPU1.

DETAILED DESCRIPTION OF THE PREFERRED EMBODIMENTS

FIG. 1 shows a schematic illustration of an exemplary embodiment of a microprocessor system 1 according to an aspect of the invention which, in addition to a main core CPU1 and coordinate processor cores CPU2 and CPU3, has a memory access module CSSB. Like the main core CPU1 too, the memory access module CSSB is assigned, as a master with its own master identifier, to the communication bus AXBS. The memory access module CSSB and the main core CPU1 have supervisor rights in the system. This results in functional system components which permit write access operations of the main core CPU1 also accepting write access operations of the memory access module CSSB. The microprocessor system 1 illustrated by way of example also comprises at least one memory management unit SMPU for controlling access to a random access memory RAM, a non-volatile memory FLASH and registers SMPUreg of the memory management unit which are connected via a peripheral bridge 2 and further peripheral modules Per1 and Per2, for example timers or A/D converters.

A peripheral CSSB register CSSBreg which stores the configuration of the access rights of the secondary cores CPU2, CPU3 is also connected to the communication bus AXBS via the peripheral interface 2. A segment of such a configuration is illustrated in FIG. 2. Only the main core CPU1 has unrestricted write access authorization to the peripheral CSSB register CSSBreg in order to configure the access rights of the secondary cores CPU2, CPU3. The secondary cores CPU2, CPU3 do not have any unrestricted write access rights to the CSSB register CSSBreg. The secondary cores do not have any access authorization, in particular write authorization, for the fields ADDR, MASK and ID of the configuration segment 3. The CSSB is preferably activated and the access rights are preferably configured by the main core CPU1 during or after a restart of the microprocessor system 1.

The memory access module CSSB carries out write operations to a memory address entered in field ADDR for a secondary core CPU2, CPU3 which is authorized in the configuration segment 3 in field ID and has precisely this identifier. The data to be written to the memory address are provided by a respective secondary core CPU2, CPU3. The identifier entered in field ID is used to specify the secondary core which is authorized to write these data to the field DATA and to write the memory requirement for these data to the field SIZE of a configuration segment 3 of the CSSB register CSSBreg. The secondary core CPU2, CPU3 having the identifier stored in the field ID has write access rights to the fields SIZE and DATA of the CSSB register CSSBreg. Access of a secondary core having an ID which differs from the entered ID is accordingly blocked. If the secondary core CPU2, CPU3 specified by the configuration has provided the memory access module CSSB with data and the memory requirement in the fields DATA and SIZE, a write operation to the address specified in field ADDR is initiated by the memory access module CSSB. Transmission of data to the memory access module CSSB by an unauthorized bus subscriber or secondary core does not result in such a write operation. In this manner, the main core prevents unauthorized write operations. The secondary cores can expediently initiate such write operations in service routines of the exception handling or in interrupts.

The configuration or a specific configuration segment 3 therefore stipulates at which address (in field ADDR) of a memory changes are permissible by which bus subscriber having the corresponding identifier in field ID, wherein the actual write operation is carried out by the memory access module CSSB. A number of configuration segments 3 corresponding to the number of write access authorizations is preferably provided in order to obtain different access possibilities.

The main core CPU1 can use the field MASK to mask the data provided by the respective secondary core CPU2, CPU3 in such a manner that, for example, only particular bits at the address stored in field ADDR can be changed. The data made available to the memory access module CSSB by a secondary core CPU2, CPU3 are modified by the memory access module CSSB before the write operation to the address stored in field ADDR in such a manner that the masked bits are not changed. For example, it may be desirable for a software module executed by means of the secondary core CPU2 to be allowed to change only bit 5 of the address 0x200 via the CSSB. In such cases, the field MASK can be used to apply a mask in order to ensure that the further bits at address 0x200 are not overwritten by the write operation.

For example, an aspect of the invention therefore makes it possible for the secondary cores to delete the flags in registers SMPUreg of the memory management unit SMPU if this is authorized according to the configuration. The access operations following a first blocked access operation can therefore be advantageously captured and useful information can therefore possibly be received. In this case, aspects of the invention are not restricted to the write access operations to flags registers of a memory management unit which are described by way of example.

The invention claimed is:

1. A microcontroller system comprising:
a main core processor;
a secondary core processor;
a communication bus for transmitting data;
a data memory for storing data, the data memory having a memory area for which the main core has write rights and the secondary core processor does not have any write rights;
a memory access module; and
a configuration memory area,
wherein the main core processor configures and stores a configuration of access rights in the configuration memory area, the configuration of access rights is for authorizing writing of secondary data provided by the secondary core processor to the memory area of the data memory, and
wherein the secondary data are written to the memory area of the data memory by the memory access module based on the configuration of access rights stored in the configuration memory area.

2. A microcontroller system as claimed in claim 1, wherein the memory access module and the main core are assigned to the communication bus as master.

3. The microcontroller system as claimed in claim 1, wherein the main core has unrestricted access rights and the secondary core has restricted write access rights to the configuration memory area.

4. The microcontroller system as claimed in claim 1, wherein the configuration can be stored in the configuration memory area by the main core.

5. The microcontroller system as claimed in claim 1, wherein the microcontroller system is configured in such a manner that the writing of the data to the memory area of the data memory can be initiated by virtue of the data being provided by the secondary core.

6. The microcontroller system as claimed in claim 1, wherein the configuration memory area comprises at least one configuration segment for configuring the authorization of the secondary core.

7. The microcontroller system as claimed in claim 6, wherein the configuration segment has an identifier field having an identifier for authorizing the secondary core having a matching identifier to write data to a data field included in the configuration segment, wherein the secondary core has write access rights for the data field and does not have any write access rights for the identifier field.

8. The microcontroller system as claimed in claim 7, wherein, if the identifiers of the identifier field and of the secondary core do not match, the memory access module is configured to block write access to the data field.

9. The microcontroller system as claimed in claim 6, wherein the configuration segment has a memory requirement field for storing a memory requirement of the data written to the data field by the secondary core, wherein the secondary core has write access rights for the memory requirement field.

10. The microcontroller system as claimed in claim 6, wherein the configuration segment has an address field for storing an address of the memory area of the data memory, wherein the secondary core does not have any write access rights for the address field.

11. The microcontroller system as claimed in claim 6, wherein the configuration segment has a mask field for storing a mask of the data provided by the secondary core, wherein the secondary core does not have any write access rights for the mask field.

12. The microcontroller system as claimed in claim 6, wherein the writing of the data to the memory area of the data memory can be initiated by the secondary core authorized by the corresponding identifier by writing at least the data to the data field of the configuration segment.

13. The microcontroller system as claimed in claim 1, wherein the main core is configured in such a manner that it stores the configuration during or after a restart of the microprocessor system.

14. A method for controlling memory access operations in a microcontroller system including a main core processor, a secondary core processor, a data memory having a memory area in which the main core processor has write rights and the secondary core processor does not have any write rights, a memory access module, and a configuration memory area, the method comprising:
 configure and store, by the main core processor, a configuration of access rights in the configuration memory area, the configuration of access rights is for authorizing writing of secondary data provided by the secondary core processor to the memory area of the data memory, and
 write, by the memory access module, the secondary data to the memory area of the data memory based on the configuration of access rights stored in the configuration memory area.

15. The microcontroller system as claimed in claim 2, wherein the main core has unrestricted access rights and the secondary core has restricted write access rights to the configuration memory area.

16. The microcontroller system as claimed in claim 7, wherein the configuration segment has a memory requirement field for storing a memory requirement of the data written to the data field by the secondary core, wherein the secondary core has write access rights for the memory requirement field.

17. The microcontroller system as claimed in claim 8, wherein the configuration segment has a memory requirement field for storing a memory requirement of the data written to the data field by the secondary core, wherein the secondary core has write access rights for the memory requirement field.

18. The microcontroller system as claimed in claim 7, wherein the configuration segment has an address field for storing an address of the memory area of the data memory, wherein the secondary core does not have any write access rights for the address field.

19. The microcontroller system as claimed in claim 8, wherein the configuration segment has an address field for storing an address of the memory area of the data memory, wherein the secondary core does not have any write access rights for the address field.

20. The microcontroller system as claimed in claim 9, wherein the configuration segment has an address field for storing an address of the memory area of the data memory, wherein the secondary core does not have any write access rights for the address field.

* * * * *